US005689196A

United States Patent [19]

Schutte

[11] Patent Number: 5,689,196
[45] Date of Patent: Nov. 18, 1997

[54] CIRCUIT COMPRISING A DATA COMMUNICATION BUS

[75] Inventor: Herman Schutte, Eindhoven, Netherlands

[73] Assignee: U.S. Philips Corporation, New York, N.Y.

[21] Appl. No.: 565,774

[22] Filed: Dec. 1, 1995

[30] Foreign Application Priority Data

Dec. 2, 1994 [EP] European Pat. Off. .......... 94203510

[51] Int. Cl.⁶ .................................................. H03K 19/175
[52] U.S. Cl. .............................. 326/86; 326/21; 326/62; 370/85.9
[58] Field of Search .................... 326/86, 21, 31, 326/62; 327/430–431; 370/85.1, 85.9, 85.11, 97

[56] References Cited

U.S. PATENT DOCUMENTS

| 3,832,489 | 8/1974 | Krishna | 178/71 R |
|---|---|---|---|
| 4,419,592 | 12/1983 | Norgren et al. | 327/403 X |
| 4,703,198 | 10/1987 | Porter et al. | 326/82 X |
| 5,084,637 | 1/1992 | Gregor | 326/81 |
| 5,107,148 | 4/1992 | Millman | 326/56 |
| 5,300,835 | 4/1994 | Assar et al. | 326/121 X |
| 5,430,726 | 7/1995 | Moorwood et al. | 370/85.11 |

FOREIGN PATENT DOCUMENTS

| 2676559 | 11/1992 | France . |
| 1224819 | 7/1989 | Japan . |

*Primary Examiner*—David R. Hudspeth
*Attorney, Agent, or Firm*—Daniel E. Tierney

[57] ABSTRACT

Information is supplied to a bus in a wired logic function, the potential on the bus either being pulled down to ground level or remaining at supply level. The data line in a bus is split into two parts which are interconnected via the main current channel a transistor. Different supply voltages are used on the two parts. The control electrode of the transistor is connected to the lowest of the supply voltages. The transistor becomes conductive when either of the parts is pulled down. The transistor is non-conductive when none of the parts is pulled down.

11 Claims, 3 Drawing Sheets

CIRCUIT COMPRISING A DATA COMMUNICATION BUS

BACKGROUND OF THE INVENTION

The invention relates to a circuit comprising a communication bus whereto a plurality of sub-circuits are connected, each sub-circuit being arranged to transmit data by driving the bus alternatively in a dominant or a recessive manner, the bus being arranged to enter a dominant state when any one of the sub-circuits drives the bus in a dominant manner and to enter a recessive state when all sub-circuits drive the bus in a recessive manner, the sub-circuits being arranged to receive data by detecting the state of the bus, said bus comprising a first and a second bus line which are interconnected via a repeater interface, in which circuit each of the first and second bus lines has at least one of the sub-circuits connected to it, the dominant and the recessive state corresponding to a dominant and a recessive level, respectively, of potentials on the first and the second bus line, the repeater interface being arranged to provide logically corresponding levels of the potentials on the first and the second bus line.

A circuit of this kind is known from section 4 of "IC20 Data Handbook 1994" published by Philips Semiconductors. This publication describes a data communication bus (the I2C bus), and a repeater interface (the 82B715 IC).

The sub-circuits in a circuit comprising the I2C bus communicate via a bus line (the SDA line). The sub-circuits constitute a wired-AND circuit in conjunction with this bus line. Each sub-circuit can thus pull the potential on the bus line to a low, "dominant" level. The potential on the bus line assumes a high, "recessive" level if none of the sub-circuits pulls down the potential on the line.

The foregoing is used for data communication and arbitration. In the case of data communication, one sub-circuit acts as a transmitter and one (or more) sub-circuits as a receiver. The transmitter controls the level of the potential on the bus line by alternately driving it to its dominant level and releasing it again. The instants at which this takes place are dependent on the data to be transmitted. The receiver detects the level of the potential on the bus line at successive instants and derives the transmitted data therefrom.

Each sub-circuit can act as a transmitter. This is because each sub-circuit can control the level of the potential on the bus line, provided that the other circuits do not drive the bus line to its dominant level. Furthermore, each sub-circuit can also act as a receive. Communication between a variety of pairs of sub-circuits is thus possible via the bus line.

The arbitration serves to ensure that upon data communication the transmitter is not disturbed in that other sub-circuits undesirably drive the bus line to the dominant state. Therefore, the data communication is preceded by an arbitration phase.

During the arbitration phase, various sub-circuits wishing control of the bus line are allowed to drive the potential on the bus line to the dominant level. During the arbitration phase these sub-circuits will also release the potential on the bus line again and subsequently detect this potential. A continued dominant level of the potential then signifies that another sub-circuit wishes to obtain control of the bus line. The sub-circuit detecting this looses the arbitration and leaves the potential on the bus line free, thereafter.

The repeater interface serves for transparent interconnection of two bus lines. A number of the sub-circuits is connected to each of the bus lines. The repeater interface ensures that when viewed from each individual sub-circuit, it appears as if there is only one bus line whereto all other sub-circuits are connected.

This means that if an individual sub-circuit drives the potential on the bus line whereto it is connected to the dominant level, the repeater interface ensures that the potential on the other bus line also assumes the dominant level. If none of the sub-circuits drives its bus line to the dominant level, the potential on both bus lines assumes the recessive level.

The bus serves notably for communication between sub-circuits in different integrated circuits. It is desirable that several of such integrated circuits can be used in one circuit arrangement, even when said integrated circuits operate with different supply voltages. It is notably desirable that data can be exchanged between a sub-circuit in a first integrated circuit operating with a first supply voltage and a sub-circuit in a second integrated circuit which cannot cope with this first supply voltage.

In the known circuit it is necessary that all sub-circuits can operate with the same recessive level and the same dominant level of the potential on the bus line. These levels correspond to the potentials on the supply terminals and are derived therefrom. Therefore, it is not possible to communicate data via the bus between sub-circuits in different integrated circuits if one of these sub-circuits operates with a supply voltage which is not compatible with the other.

This problem can in principle be solved by choosing the difference between the dominant level and the recessive level so as to be smaller than the difference between the potentials on the supply terminals of the integrated circuit operating with the highest supply voltage. However, this would mean that these integrated circuits would have to be especially designed for communication with other integrated circuits.

Furthermore, with a view to saving energy it is desirable that the supply of energy to a part of the sub-circuits can be deactivated when these sub-circuits are not necessary. For data communication between the other sub-circuits, however, potential changes on the bus line should still be possible. These potential changes could damage the sub-circuits whose energy supply is deactivated, or these sub-circuits could obstruct potential changes on the bus line.

SUMMARY OF THE INVENTION

It is inter alia an object of the invention to provide a circuit in which data communication is possible between sub-circuits incorporated in different integrated circuits operating with different supply voltages.

The circuit in accordance with the invention is characterized in that it comprises means which are arranged to make the potentials on the first and the second bus line assume a respective recessive level in the absence of dominant driving, and independently of one another, and that the repeater interface is arranged to render a connection between the first and the second bus line conductive when the potential on the first and/or on the second bus line is between the dominant level and a reference level of the relevant bus line, and to render the connection isolating when the potential on the first and the second bus line is between the reference level of the relevant bus line and the respective recessive level of the relevant bus line. The bus lines are thus isolated from one another when their potential is at the recessive level, because none of the sub-circuits drives the potential on any bus line to the dominant level. The potentials on the bus lines can thus assume a respective recessive level. Therefore, sub-circuits requiring a comparatively high recessive level can be connected to the first bus line. Sub-circuits which can stand only a comparatively low recessive level can be connected to the second bus line.

If one of the sub-circuits drives the potential on its bus line to the dominant level, the potential on the other bus line will also be driven to the dominant level via the interface circuit. The data communication and arbitration can then be executed as usual, irrespective of the bus line whereto the relevant sub-circuits are connected.

An embodiment of the circuit in accordance with the invention is characterized in that the repeater interface comprises a transistor having a main current channel and a control electrode, the connection between the first and the second bus line extending via the main current channel and the control electrode being coupled to a potential of a predetermined level so that the reference levels correspond to the predetermined level minus a transistor threshold voltage. The use of the transistor enables very simple implementation of the repeater interface.

A further embodiment of the circuit in accordance with the invention is characterized in that the transistor is an N-channel normally-off MOSFET and that the gate electrode of the transistor receives a potential of the recessive level of the second bus line. The reference potential is thus simply realised.

An embodiment of the circuit in accordance with the invention is characterized in that it comprises switching means for together
  interrupting energy supply to the sub-circuit or the sub-circuits connected to the second bus line,
  reducing the recessive level of the potential on the second bus line to substantially the dominant level,
  reducing the reference level to at least the dominant level, so that the connection between the first and the second bus line continues to isolate. By turning off the reference potential as well as the energy supply to the sub-circuits connected to the second bus line, energy is saved without the sub-circuits being damaged or without the operation of the other sub-circuits being disturbed.

A further embodiment of the invention is characterized in that a sub-circuit connected to the first bus line is coupled to the switching means for control. The sub-circuits connected to the second bus line can thus be activated again by way of a command received via the first bus line.

A further embodiment of the invention is characterized in that the second bus line is coupled to the first bus line via successively said connection, a third bus line and a further connection whose functionality is analogous to that of said connection, the circuit comprising means for driving the third bus line to a recessive level in the absence of dominant driving. Thus, the sub-circuits connected to the first bus line and/or the sub-circuits connected to the second bus line can be deactivated as desired and independently from the another.

BRIEF DESCRIPTION OF THE DRAWINGS

These and other embodiments of the invention and their features will be described in detail hereinafter with reference to some Figures.

DETAILED DESCRIPTION OF THE PREFERRED EMBODIMENTS

Figure 1:
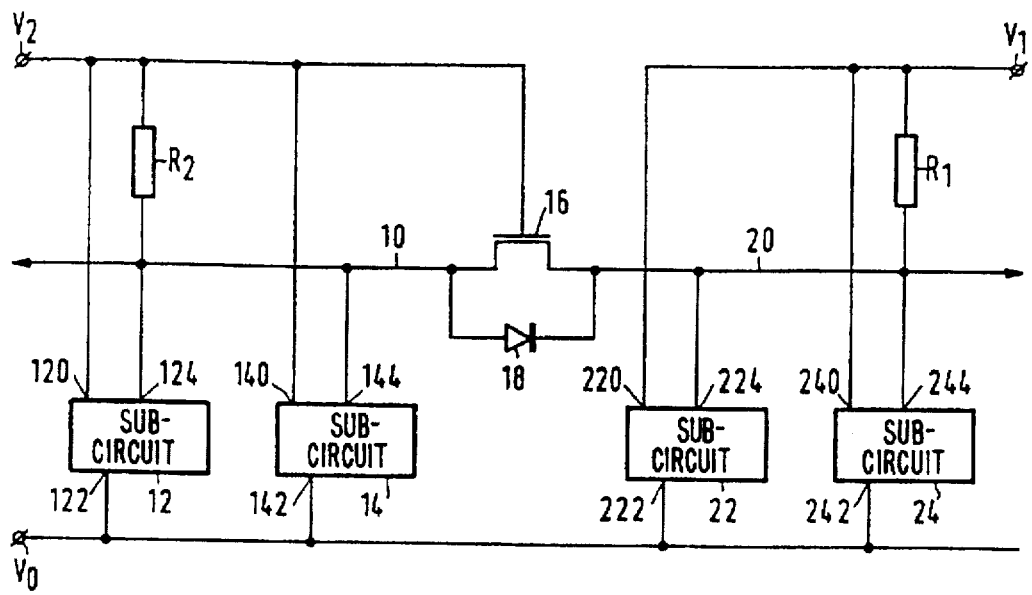
FIG. 1 shows a first embodiment of a circuit in accordance with the invention.

FIG. 1 shows a first embodiment of a circuit in accordance with the invention. This circuit comprises a first bus line 20 and a second bus line 10.

By way of example, two sub-circuits 22, 24 are connected to the first bus line 20 via a respective bus interface output 224, 244. Each of the sub-circuits 22, 24 comprises two supply inputs 222, 220, 242, 240 which are connected to a first and a second supply terminal, $V_0$ and $V_1$, respectively. The second supply terminal $V_1$ is connected to the first bus line 20 via a resistive element R1.

By way of example, two sub-circuits 12, 14 are connected to the second bus line 10 via a respective bus interface output 124, 144. Each of the sub-circuits 12, 14 comprises two supply inputs 122, 120, 142, 140 which are connected to a first supply terminal $V_0$ and a third supply terminal $V_2$, respectively. The third supply terminal $V_2$ is connected to the second bus line 10 via a resistive element R2.

The first and the second bus line 20, 10 are interconnected via the channel of a transistor 16, shown as an N-channel FET. The control electrode of this transistor is connected to the third supply terminal $V_2$. A diode 18 is shown in parallel to the channel of the transistor 16. When transistor 16 is a MOSFET (or more generally an IGFET) its backgate (substrate) is preferably connected to its source. As a consequence, the backgatedrain drain diode will be in parallel to the channel of transistor 16. This is expressed by diode 18.

A first supply voltage $VA=V_1-V_0$ is applied between the first and the second supply terminal, $V_0$, $V_1$, during operation. Between the first and the third supply terminal, $V_0$, $V_2$, a second supply voltage $VB=V_2-V_0$ is applied. The first supply voltage VA is higher than the second supply voltage VB; these voltages are, for example 5 V and 3.3 V, respectively (±10%).

The transistor 16 is, for example an N-channel enhancement field effect transistor whose channel is not conductive when the potential on its gate (connected to the third supply terminal) is equal to the potential on its source (connected to the second bus line 10) and lower than the potential on its drain (connected to the first bus line 20). The channel is turned on only if the potential on the source and/or the drain is more than a threshold voltage VT (for example, 1.5 V) below the potential on the gate.

For as long as none of the sub-circuits establishes a conductive path to the first supply terminal, therefore, the potential on the first bus line 20 will be a first supply voltage VA higher than the potential on the first supply terminal $V_0$ whereas the potential on the second bus line 10 will be a second supply voltage VB higher than the potential on the first supply terminal $V_0$. The potential on the second bus line 10, therefore, is lower than the potential on the first bus line 20 (for example, 1.7 V lower in the case of supply voltages of 5 V and 3.3 V) and equal to the potential on the gate of the transistor 16.

When one of the sub-circuits (for example, 12) establishes a conductive path between the second bus line 10 and the first supply terminal $V_0$, the potential on the second bus line 10 will be pulled to the potential on the first supply terminal $V_0$. As a result, the potential on the source of the transistor 16 will be lower than the potential on the gate by an amount which is sufficient to turn on the channel of the transistor 16. As a result, the potential on the first bus line 20 is also pulled to the potential on the first supply terminal $V_0$.

When the sub-circuit 12 establishing the conductive path interrupts said path again, the potential on the bus lines 10, 20 is pulled up again under the influence of the resistive elements R1, R2 (provided of course that none of the other sub-circuits establishes a conductive connection between the bus lines 10, 20 and the first supply terminal $V_0$). The channel of the transistor 16 then remains turned on for the time being until the potential on the second bus line 10 has increased to such an extent that it is less than one threshold voltage VT below the potential on the gate of the transistor 16. Subsequently, the channel of the transistor 16 is turned off and the potentials on the first and the second bus line 20, 10 increase further, in an independent manner, until the potential on the first bus line 20 reaches the potential on the second supply terminal $V_1$ again and the potential on the second bus line 10 reaches the potential on the third supply terminal $V_2$ again.

When one of the sub-circuits (for example 22) establishes a conductive path between the first bus line 20 and the first supply terminal $V_0$, a similar effect occurs: the potential on the second bus line 10 is pulled down via the first bus line 20. When the backgate of transistor is connected to its source, diode 18 will start to conduct, pulling second bus line 10 down. Due to the diode 18 the potential on the drain cannot drop very far below the potential on the source. Of course, the backgate of transistor 16 could also be kept at its own potential, for example $V_0$, in this case the potential on the second bus line 10 will be pulled down when the potential on the first bus line 20 drops sufficiently below the potential on the gate of transistor 16 to make the channel of this transistor 16 conductive.

When several sub-circuits simultaneously establish a conductive path between one of the bus lines 10, 20 and the first supply terminal $V_0$, both bus lines 10, 20 will be pulled to the potential of the first supply terminal $V_0$. This potential, therefore, corresponds to a dominant level of the potential on the bus lines 10, 20. The potentials of the second and the third supply terminal correspond to the recessive levels of the potential on the first bus line 20 and the second bus line 10, respectively.

The circuit is, therefore, suitable for data communication between the sub-circuits 12, 14, 22, 24 utilizing dominant and recessive states of the bus (by way of wired logic). An example of a circuit and a protocol for such communication concerns the I2C bus as described, for example in "IC20 Data Handbook 1994", Philips Semiconductors, section 4, which is incorporated herein by way of reference. This section also contains a number of examples of sub-circuits. The I2C bus utilizes a data line SDA and a clock line SCL, both of which are controlled by means of the dominant/recessive states.

Figure 2:
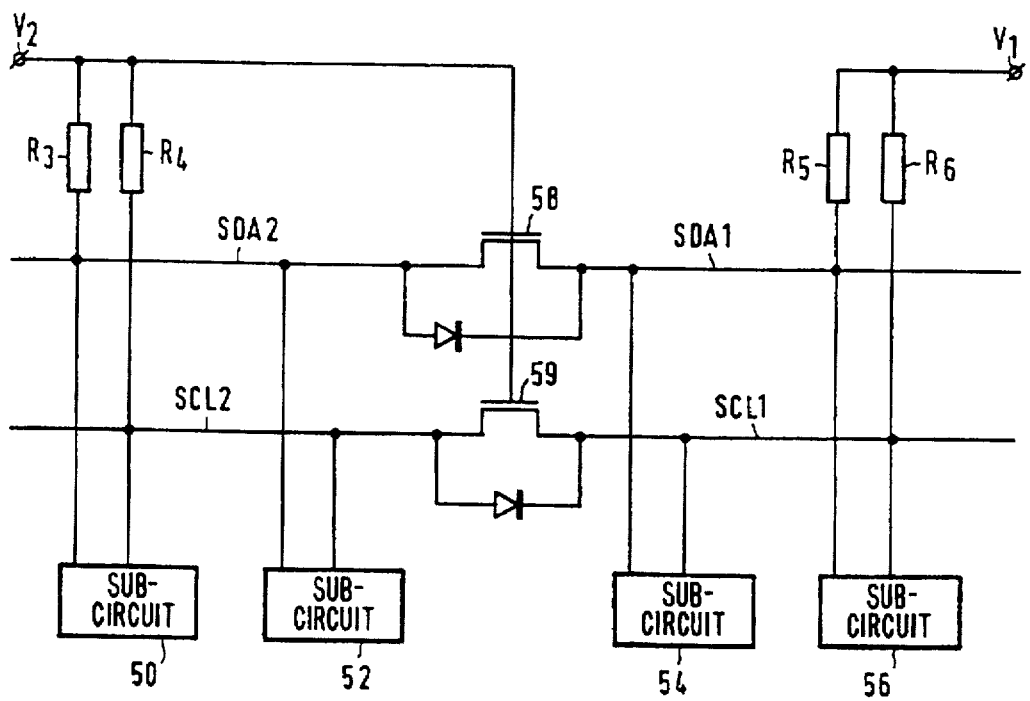
FIG. 2 shows a second embodiment of a circuit in accordance with the invention.

FIG. 2 shows a circuit in accordance with the invention for use in conjunction with the I2C bus. Herein, the first bus line 20 of FIG. 1 is replaced by two conductive lines SDA1 and SCL1, each of which is coupled to the second supply terminal $V_1$ via a respective resistive element R5, R6. The second bus line 10 of FIG. 1 is replaced by two conductive lines SDA2 and SCL2, each of which is coupled to the third supply terminal $V_2$ via a respective resistive element R3, R4. The conductive lines SDA1, SCL1 are coupled to the conductive lines SDA2, SCL2, respectively, via the channel of a transistor 58, 59. The gates of the transistors 58, 59 are coupled to the third supply terminal $V_2$. Sub-circuits 54, 56 are coupled to the conductive lines SDA1, SCL1. Sub-circuits 50, 52 are coupled to the conductive lines SDA2, SCL2. The supply inputs of the sub-circuits 50, 52, 54, 56 have been omitted for the sake of clarity.

Each of the conductive lines SDA1, SDA2, with the connecting transistor 58, operates in the same way as described for the bus lines 10, 20 in FIG. 1. The same holds for the lines SCL1 and SCL2 with the connecting transistor 59. The logic use of these lines is described in the cited "Data Handbook".

The invention is not restricted to the I2C bus, but can also be used for other buses, for example parallel busses or point to point connections.

Figure 3:
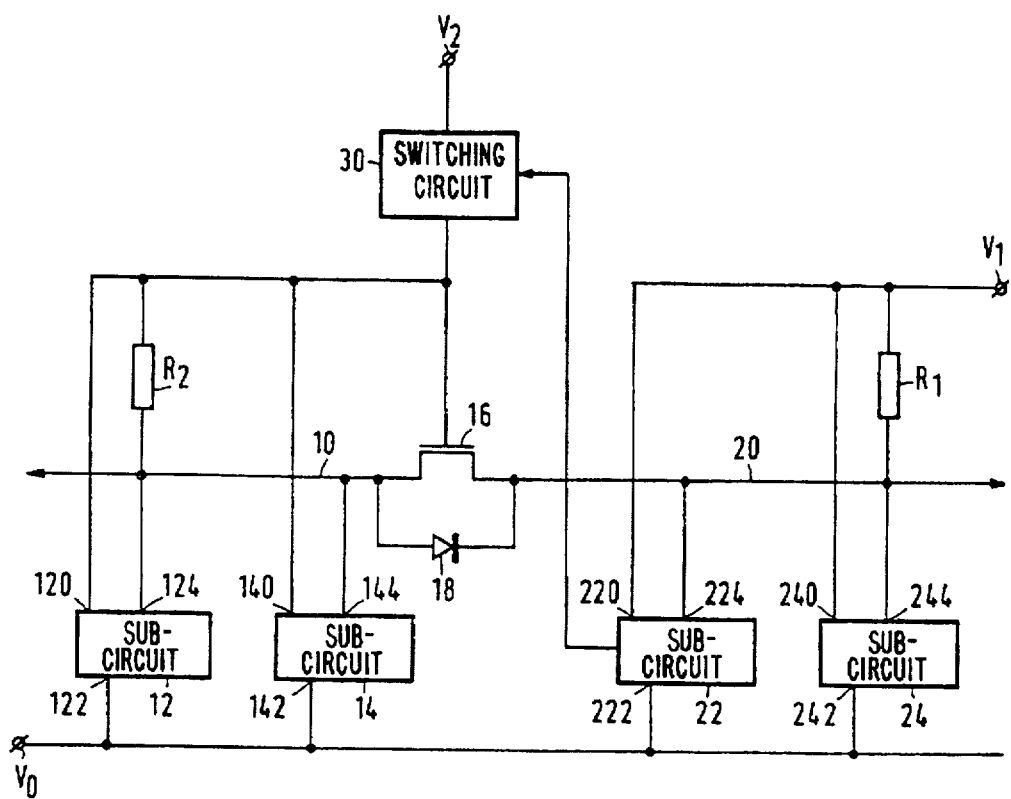
FIG. 3 shows a third embodiment of a circuit in accordance with the invention.

FIG. 3 shows a further embodiment of the circuit in accordance with the invention. Correspondence exists between this Figure and FIG. 1 and corresponding components are denoted by corresponding references. The difference in relation to FIG. 1 consists in that a switching circuit 30 is inserted between on the one side the third supply terminal $V_2$ and on the other side the resistive element R2, the gate of the transistor 16 and the supply inputs 120, 140 of the sub-circuits 12, 14 coupled to the second bus line 10. One of the sub-circuits (22) connected to the first bus line 20 has a control output which is connected to a control input of the switching circuit 30.

The switching circuit 30 serves to reduce the supply voltage of the sub-circuits 12, 14, connected to the second bus line 10, without unnecessarily disturbing the data communication. A first embodiment of the switching circuit has two states: a conductive state and a non-conductive state. In the conductive state, the switching circuit 30 passes on the potential on the third supply terminal $V_2$. In this conductive state the sub-circuits 12, 14 and the second bus line 10 operate as described with reference to FIG. 1.

In the non-conductive state, the potential on the gate of the transistor 16, on the second bus line 10 and on the supply inputs 120, 140 of the sub-circuits 12, 14 assumes substantially the level of the potential on the first supply terminal $V_0$. The sub-circuits 12, 14 are then deactivated and the transistor 16 is turned off. As a result, energy is saved, whereas the sub-circuits 22, 24 which are connected to the first bus line 20 and which are powered as usual can communicate as usual without being disturbed by the second bus line 10, because the transistor 16 isolates the deactivated part of the circuit from the first bus line 20.

Evidently, the collective deactivation of the energy supply for the sub-circuits 12, 14 and the gate of the transistor 16 and the second bus line 10 can be carried out in a variety of ways; it is not necessary for these elements to be connected directly to one another as is shown for the sake of simplicity in FIG. 3.

The switching circuit 30 is preferably controlled by a sub-circuit 22 connected to the first bus line 20. Thus, the second bus line can be switched on and off under the control of the first bus line 20. Switching on and off of the switching circuit 30, however, can also take place by means of a central control unit (not shown) or a manually operated switch.

A further embodiment of the switching circuit 30 is arranged to apply, in dependence on a control signal, a reduced potential level (between the level of the potential on the third supply terminal $V_2$ and the first supply terminal $V_0$) in an intermediate state to the gate of the transistor 16, to the second bus line 10 and to the supply inputs 120, 140 of the sub-circuits 12, 14. The sub-circuits 12, 14 can thus be switched to a low-energy mode (possibly a slower mode) and still communicate with the other sub-circuits 22, 24 via the bus lines 10, 20.

Figure 4:
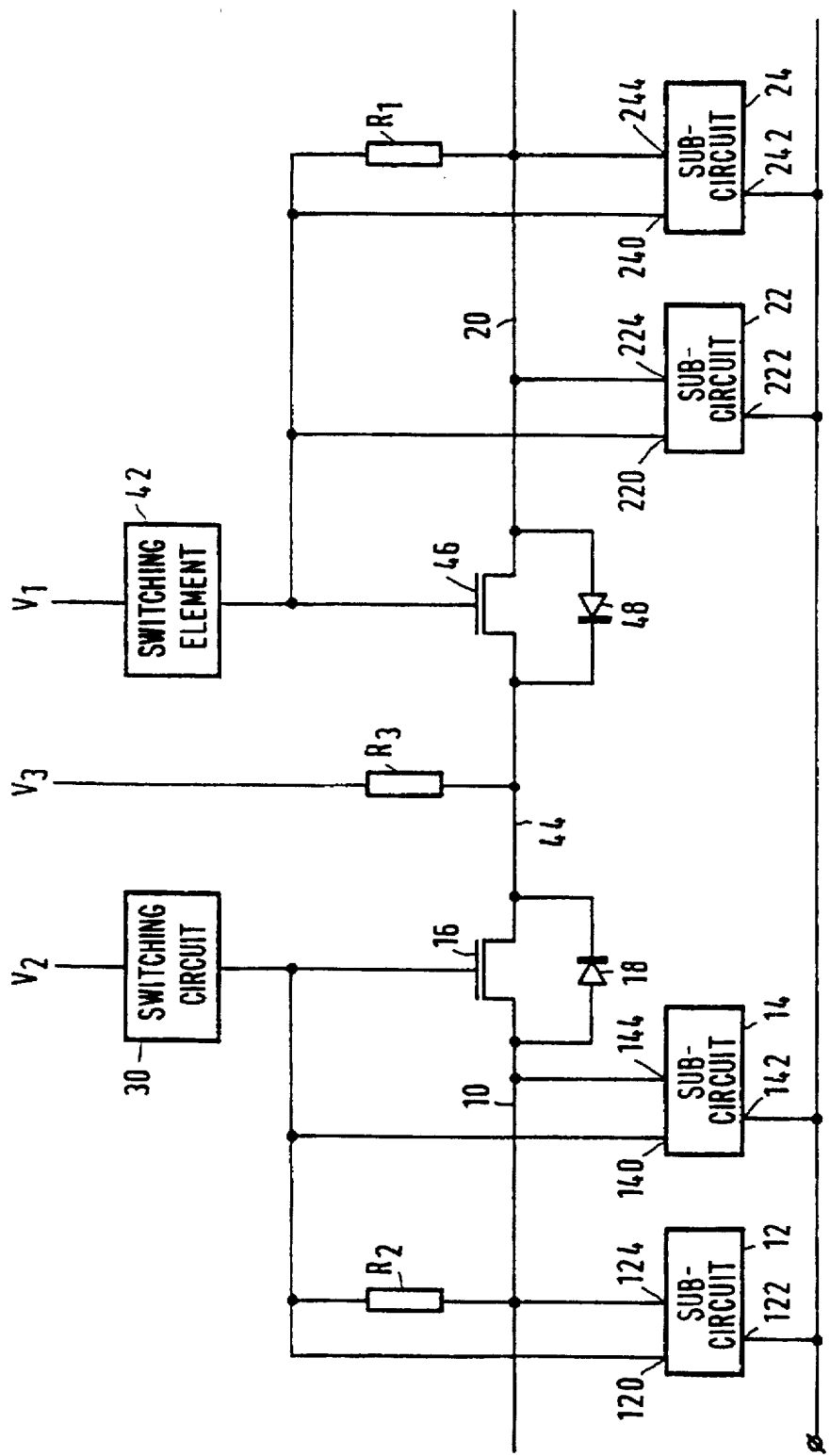
FIG. 4 shows a fourth embodiment of a circuit in accordance with the invention.

FIG. 4 shows a further embodiment of the circuit in accordance with the invention. The Figure is similar to FIG. 3 and corresponding components are denoted by corresponding references.

A third bus line 44 is inserted between the first and the second bus line 20, 10. The third bus line 44 is connected to the first bus line 20 via the channel of a transistor 46. A diode 48 is connected parallel to said channel. The third bus line 44 is connected to the second bus line 10 via the channel of the transistor 16. The third bus line 44 is coupled to a fourth supply terminal $V_3$ via a resistive element R3.

The gate of the transistor 46 is connected to the supply inputs 220, 240 of the sub-circuits 22, 24 coupled to the first bus line 20. This gate is also connected, via the resistive element R1, to the first bus line 20. The gate is coupled to the second supply terminal $V_1$ via a first switching element 42.

The sub-circuits 12, 14 connected to the second bus line 10 can be driven to a low (no) energy consumption state and/or the sub-circuits 22, 24 connected to the first bus line 20 can be driven to a low (no) energy consumption state. The sub-circuits 12, 14, 22, 24 which receive energy can communicate with one another. A relationship is thus established between the levels of the potential on the first and the second bus line 20, 10 on the one side and the level of the potential on the third bus line 44 on the other side. This relationship is analogous to the relationship described with reference to FIG. 1 and existing between potential levels on the second bus line 10 on the one side and the first bus line 20 on the other side.

Furthermore, via connections which are analogous to the connection via the transistor 16, an arbitrary number of further bus lines can be connected to the third bus line. Each bus line can then be switched on and off, together with the sub-circuits connected thereto, independently of the other bus lines. Furthermore, further bus lines can be coupled to the first or the second bus line in an analogous manner.

Even though the invention has been described on the basis of an NMOS field effect transistor 16, evidently other types of transistors or other switching elements can be used instead without departing from the scope of the invention. It suffices that the switching element isolates when the bus is in the recessive state and that it is conductive when the circuit is in the dominant state. For the resistive elements use can be made of, for example resistors, but other means ensuring that the potential on the bus lines assumes a predetermined level in the absence of dominant driving are also suitable, for example a load transistor.

I claim:

1. A circuit comprising a communication bus whereto a plurality of sub-circuits are connected, each sub-circuit being arranged to transmit data by driving the bus alternatively in a dominant or recessive manner, the bus to enter a dominant state when any one of the sub-circuits drives the bus in a dominant manner and to enter a recessive state when all sub-circuits drive the bus in a recessive manner, the sub-circuits being arranged to receive data by detecting the state of the bus, said bus comprising a first and a second bus line which are interconnected via a repeater interface, in which circuit each of the first and second bus lines has at least one of the sub-circuits connected to it, the dominant and the recessive state corresponding to a dominant and a recessive level, respectively, of potentials on the first and the second bus line, the repeater interface being arranged to provide logically corresponding levels of the potentials on the first and the second bus line, characterized in that the circuit comprises means which are arranged to make the potentials on the first and the second bus line assume a respective recessive level in the absence of dominant driving and independently of one another, and that the repeater interface renders a connection between the first and the second bus line conductive when the potential on the first at least one of bus line and the second bus line is between the dominant level and a reference level of the relevant bus line, and to render the connection isolating when the potential on the first and the second bus line is between the reference level of the relevant bus line and the respective recessive level of the relevant bus line.

2. A circuit as claimed in claim 1, arranged to render a first difference between the recessive level of the first bus line and the dominant level larger than a second difference between the recessive level of the second bus line and the dominant level during operation.

3. A circuit as claimed in claim 1, characterized in that the repeater interface comprises a transistor having a main current channel and a control electrode, the connection between the first and the second bus line extending via the main current channel and the control electrode being coupled to a potential of a predetermined level so that the reference levels correspond to the predetermined level minus a transistor threshold voltage.

4. A circuit as claimed in claim 3, wherein the transistor is an N-channel normally-off IGFET or MOSFET.

5. A circuit as claimed in claim 4, wherein a backgate of the transistor is connected to an electrode of the main current channel of the transistor which is connected to the second bus line.

6. A circuit as claimed in claim 4, wherein the control electrode of the transistor receives a potential of the recessive level of the second bus line.

7. A circuit as claimed in claim 1, comprising switching means for together
   interrupting energy supply to the sub-circuit or the sub-circuits connected to the second bus line,
   reducing the recessive level of the potential on the second bus line to substantially the dominant level,
   reducing the reference level to at least the dominant level, so that the connection between the first and the second bus line continues to isolate.

8. A circuit as claimed in claim 7, wherein a sub-circuit connected to the first bus line is coupled to the switching means for control.

9. A circuit as claimed in claim 7, wherein the second bus line is coupled to the first bus line via successively said connection, a third bus line and a further connection whose functionality is analogous to that of said connection, the circuit comprising means for driving the third bus line to a recessive level in the absence of dominant driving.

10. A circuit as claimed in claim 2, characterized in that the repeater interface comprises a transistor having a main current channel and a control electrode, the connection between the first and the second bus line extending via the main current channel and the control electrode being coupled to a potential of a predetermined level so that the reference levels correspond to the predetermined level minus a transistor threshold voltage.

11. A circuit as claimed in claim 4, wherein the control electrode of the transistor receives a potential of the recessive level of the second bus line.

* * * * *